United States Patent [19]

Hwang et al.

[11] Patent Number: 5,799,208
[45] Date of Patent: Aug. 25, 1998

[54] APPARATUS FOR DATA COMMUNICATION BETWEEN UNIVERSAL ASYNCHRONOUS RECEIVER/TRANSMITTER (UART) MODULES AND TRANSCEIVERS IN A CHIP SET BY SELECTIVELY CONNECTING A COMMON BUS BETWEEN MULTIPLEXER/ DEMULTIPLEXER UNITS

[75] Inventors: Chyou-Hsiung Hwang, Hsinchu; Cheng-Wang Huang, Chupei, both of Taiwan

[73] Assignee: United Microelectronics Corporation, Hsinchu, Taiwan

[21] Appl. No.: 626,947

[22] Filed: Apr. 3, 1996

[51] Int. Cl.[6] ............................................. G06F 13/40
[52] U.S. Cl. ............................................. 395/858; 370/535
[58] Field of Search ................................. 395/282, 842, 395/309, 280; 711/219

[56] References Cited

U.S. PATENT DOCUMENTS 5,335,329  8/1994  Cox et al. ........................ 395/282
5,519,872  5/1996  Khandekar et al. ............... 711/219
5,590,377  12/1996  Smith ............................. 395/842
5,632,021  5/1997  Jennings et al. .................. 395/309
5,664,117  9/1997  Shah et al. ....................... 395/280

Primary Examiner—Thomas C. Lee
Assistant Examiner—David Ton
Attorney, Agent, or Firm—Rabin & Champagne, P.C.

[57] ABSTRACT

An apparatus that provides data communication between universal asynchronous receiver/transmitter (UART) modules on a first IC chip of a chip set and associated transceivers on a second IC chip of the same chip set. The apparatus includes a first multiplexer/demultiplexer unit coupled by first buses to the UART modules, and a second multiplexer/demultiplexer unit coupled by second buses to the transceivers. A common bus is interconnected between the first multiplexer/demultiplexer unit and the second multiplexer/demultiplexer unit. A control unit selectively connects the common bus to one of the first buses and one of the second buses so as to connect one of the UART modules in the first IC chip to the associated transceiver in the second IC chip.

10 Claims, 2 Drawing Sheets

APPARATUS FOR DATA COMMUNICATION BETWEEN UNIVERSAL ASYNCHRONOUS RECEIVER/TRANSMITTER (UART) MODULES AND TRANSCEIVERS IN A CHIP SET BY SELECTIVELY CONNECTING A COMMON BUS BETWEEN MULTIPLEXER/ DEMULTIPLEXER UNITS

BACKGROUND OF THE INVENTION

1. Field of the Invention

The invention relates to data communications, and more particularly, to an apparatus for data communication using a reduced number of signal lines, between a plurality of universal asynchronous receiver/transmitter (UART) modules on a first IC chip of a chip set and a plurality of associated transceivers on a second IC chip of the same chip set.

2. Description of the Related Art

A UART is a module, usually composed of a single integrated circuit, that contains both the receiving and transmitting circuits required for asynchronous serial communication between two computers. When a UART module is used in conjunction with an RS-232 interface, a transceiver in compliance with the RS-232 standard is required to be coupled between the UART module and the RS-232 interface. In other words, the transceiver must be capable of transforming the operating voltage from 5V to 12V and vice versa from 12V to 5V. According to the RS-232 standard, the wire connection between a UART module and an RS-232 interface requires the use of at least 8 signal lines so as to provide a comprehensive set of data communication capabilities.

FIG. 1 shows the use of a so-called Super I/O Chip 10 connected via a transceiver chip 13 to two RS-232 interfaces 16, 17 on a personal computer. The Super I/O Chip 10 is composed of two UART modules, including a first UART module 11 and a second UART module 12. Correspondingly, the transceiver chip 13 is composed of two transceivers, including a first transceiver 14 and a second transceiver 15. The first UART module 11 is wire connected to the first transceiver 14 by a first bus 18a and the second UART module 12 is wire connected to the second transceiver 15 by a second bus 18b. The first transceiver 14 is also wire connected to the first RS-232 interface 16 by a third bus 18c, and the second transceiver 15 also is wire connected to the second RS-232 interface 17 by a fourth bus 18d.

The buses 18a, 18b, 18c, and 18d are each composed of a set of signal lines for transmission of signals according to the RS-232 standard, which includes at least the following 8 signals:

SIN (Serial Data Input)
SOUT (Serial Data Output)
RTS (Request To Send Output)
DTR (Data Terminal Ready Output)
CTS (Clear To Send Input)
DSR (Data Set Ready)
RI (Ring Indicator)
RLSD (Receiver Line Signal Detect)

Based on the conventional circuit configuration shown in FIG. 1, in which the Super I/O Chip 10 is disposed on the left, the SIN, CTS, DSR, RI, and RLSD signals are sent from the right to the left while the SOUT, RTS, and DTR signals are sent from the left to the right.

In the circuit configuration, the first UART module 11 and the second UART module 12 are connected respectively to the first transceiver 14 and the second transceiver 15, by the first bus 18a and the second bus 18b, respectively. Since the buses 18a, 18b each include at least 8 signal lines, the wire connection between the Super I/O Chip 10 and the transceiver chip 13 requires the use of a total of at least 16 signal lines. The provision of each additional UART module thus requires at least an additional 8 signal lines. A number of UART modules thus requires at least an eightfold number of signal lines or pins for wire connection between the UART modules and the corresponding transceivers. Such a large number of signal lines and pins on the IC chip has several drawbacks. First, the package cost is increased as the number of pins is increased. Second, the complexity of assembling the chip set is increased. Third, the manufacturing cost is also increased due to an increase in the chip area.

SUMMARY OF THE INVENTION

It is therefore an object of the invention to provide an apparatus for data communication between a plurality of UART modules and transceivers in different IC chips of a chip set, that allows the number of signal lines required for data transmission between the UART modules and the transceivers to be reduced so as to eliminate the aforementioned drawbacks.

In accordance with the foregoing and other objects of the invention, a new and improved apparatus for data communication between UART modules and transceivers in different IC chips of a chip set is provided. The apparatus includes a first multiplexer/demultiplexer unit coupled by first buses to the UART modules. A second multiplexer/demultiplexer unit is coupled by second buses to the transceivers. A common bus couples the first multiplexer/demultiplexer unit and the second multiplexer/demultiplexer unit. A control unit selectively controls the multiplexers to connect the common bus to one of the first buses and one of the second buses so as to connect one of the UART modules in the first IC chip to the associated transceiver in the second IC chip.

The use of a common bus in a multiplexed manner between the UART modules and the associated transceivers allows the number of lines between the two IC chips, and therefore the number of pins on each IC chip, to be reduced, thus significantly reducing the complexity and manufacturing cost of the chip set.

BRIEF DESCRIPTION OF THE DRAWINGS

The invention can be more fully understood from the following detailed description of the preferred embodiment with reference to the accompanying drawings, wherein.

DETAILED DESCRIPTION OF THE PREFERRED EMBODIMENT

Figure 1:
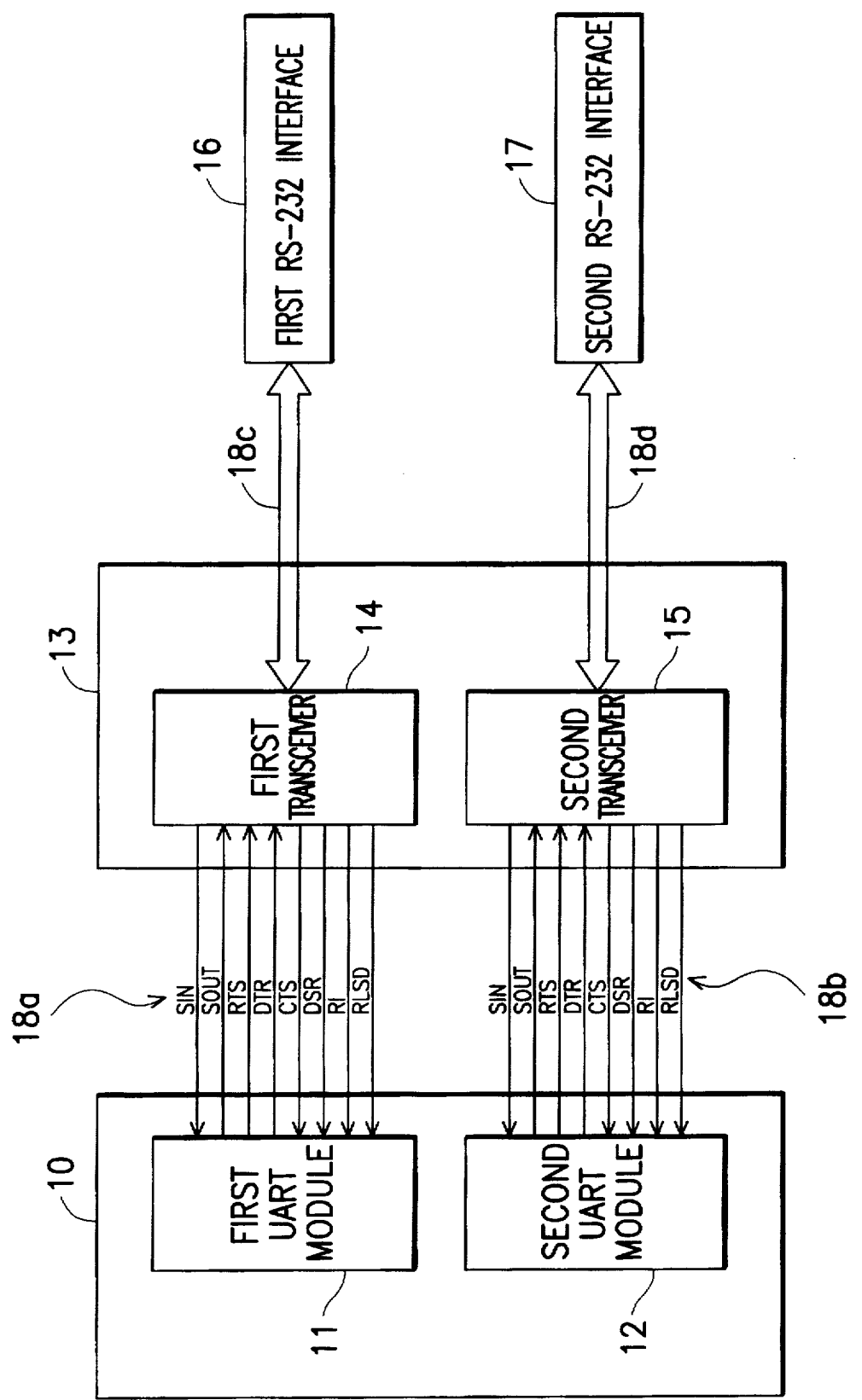
FIG. 1 is a schematic block diagram of a conventional circuit configuration for data communication between two UART modules in an IC chip and two associated transceivers in another IC chip.
Figure 2:
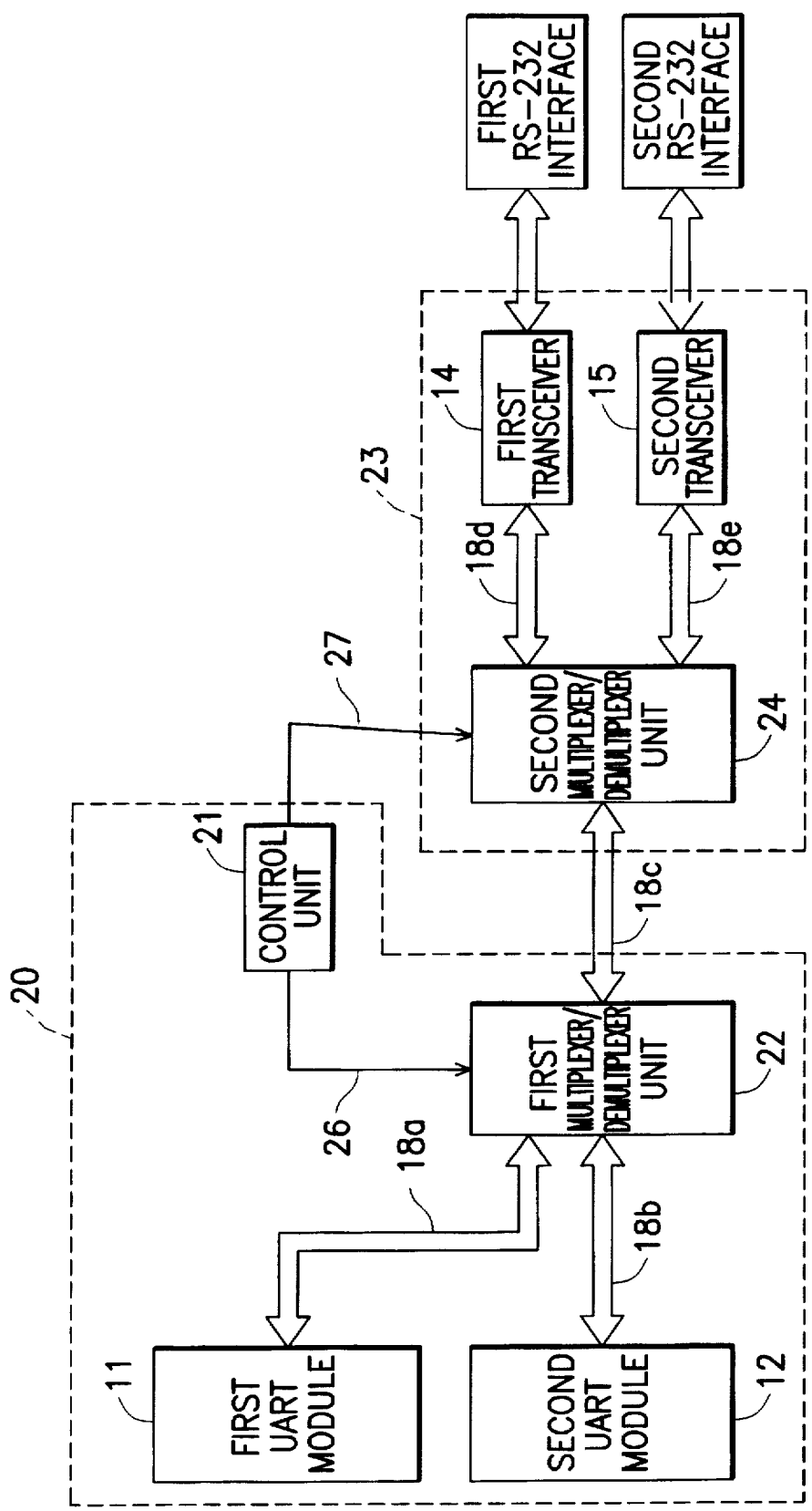
FIG. 2 is a schematic block diagram of an apparatus according to the invention on a chip set, for providing data communication between two UART modules in an IC chip and two associated transceivers in another IC chip.

FIG. 2 shows a schematic block diagram of an apparatus according to the invention on a chip set, for providing data communication between two UART modules 11, 12 in a first IC chip 20 and two associated transceivers 14, 15 in a second IC chip 23. The UART modules 11, 12 and the transceivers 14, 15 are identical with those shown in FIG. 1. However, although the preferred embodiment disclosed herein is used for data communication between two UART modules and two associated transceivers, it is to be understood that with modifications within the scope and spirit of the invention, data communication can be provided between any plural number of UART modules and associated transceivers.

In addition to the UART modules 11, 12, the first IC chip 20 is provided with a control unit 21 and a first multiplexer/demultiplexer unit 22. Correspondingly, the second IC chip 23 is provided with a second multiplexer/demultiplexer unit 24. Both multiplexer/demultiplexer units 22, 24 are controlled by the control unit 21.

In the first IC chip 20, the first UART module 11 and the second UART module 12 are wire connected to the first multiplexer/demultiplexer unit 22 respectively by a first bus 18a and a second bus 18b. The first multiplexer/demultiplexer unit 22 is also wire connected to the second multiplexer/demultiplexer unit 24 by a third bus 18c which serves as a common bus for data transmission between the UART modules 11, 12 and the transceivers 14, 15. In the second IC chip 23, the first transceiver 14 and the second transceiver 15 are wire connected to the second multiplexer/demultiplexer unit 24 by a fourth bus 18d and a fifth bus 18e, respectively. The buses 18a, 18b; 18c, 18d, and 18e each include at least eight signal lines respectively used for transmission of at least the SIN, SOUT, RTS, DTR, CTS, DSR, RI, and RLSD signals. The first UART module 11 is thus connected to the first transceiver 14 via the first bus 18a, the first multiplexer/demultiplexer unit 22, the third bus 18c, the second multiplexer/demultiplexer unit 24 and the fourth bus 18d. Similarly, the second UART module 12 is connected to the second transceiver 15 via the second bus 18b, the first multiplexer/demultiplexer unit 22, the third bus 18c, the second multiplexer/demultiplexer unit 24 and the fifth bus 18e.

The control unit 21 controls the first multiplexer/demultiplexer unit 22 and the second multiplexer/demultiplexer unit 24 in such a way as to assign the third bus 18c to the first UART module 11 or to the second UART module 12 for data transmission and reception. When the third bus 18c is assigned for use by the first UART module 11 for data communication with the first transceiver 14, the control unit 21 issues two control signals, including a first control signal over the control line 26 to the first multiplexer/demultiplexer unit 22 and a second control signal over the control line 27 to the second multiplexer/demultiplexer unit 24. The first control signal causes the first multiplexer/demultiplexer unit 22 to connect the first bus 18a to the third bus 18c, and the second control signal causes the second multiplexer/demultiplexer unit 24 to connect the fourth bus 18d to the third bus 18c. As a result, the signals issued by the first UART module 11 are sent over the first bus 18a, the third bus 18c, and the fourth bus 18d to the first transceiver 14, and in reverse, the signals issued by the first transceiver 14 are sent over the fourth bus 18d, the third bus 18c, and the first bus 18a to the first UART module 11.

In the preferred embodiment, the first multiplexer/demultiplexer unit 22 and the second multiplexer/demultiplexer unit 24 are each provided with latches capable of maintaining received signals. Currently, the fastest achievable data transmission rate (baud rate) by a UART is 115.2 Kbit/sec. Therefore, the control unit 21 can use a higher rate, such as 1.8432 MHz, for switching circuit connections in the first multiplexer/demultiplexer unit 22 and in the second multiplexer/demultiplexer unit 24. This allows the performance of the chip set utilizing the invention to be comparable to that available with conventional apparatus, while the number of pins needed for connection between the IC chips is significantly reduced.

It can be clearly seen from FIG. 2 that the wire connection between the first IC chip 20 and the second IC chip 23 requires the use of only the third bus 18c, which typically includes only eight signal lines, and the control line. Thus, in total, nine lines typically are needed to interconnect the two chips, using nine pins on each chip. Compared to the prior art of FIG. 1, which requires a total of at least 16 signal lines, the invention allows the number of pins for interconnecting the two IC chips to be significantly reduced. If the number of UART modules is increased to 3, only an additional control line is needed, so that only 10 pins per chip typically are required, as compared to the requirement of at least 24 pins per chip in the prior art. When the number of UART modules is increased to 4, the same number of control lines is needed. Therefore, the total number of pins per chip typically is still only 10. This is in contrast to the prior art in which the requirement is for at least 4×8=32 pins per chip.

The invention has been described above with exemplary embodiments. However, it is to be understood that the scope of the invention is not limited to the disclosed embodiments. To the contrary, the invention is intended to cover various modifications and similar arrangements within the scope defined in the following appended claims. The scope of the claims therefore should be accorded the broadest interpretation so as to encompass all such modifications and similar arrangements.

What is claimed is:

1. In an apparatus in which data communication is provided between a plurality of universal asynchronous receiver/transmitter (UART) modules in a first IC chip and a plurality of transceivers in a second IC chip, the transceivers being connected to a plurality of RS-232 interfaces, the improvement comprising:

(a) a first multiplexer/demultiplexer unit and a plurality of first bi-directional buses coupling said first multiplexer/demultiplexer unit to the plurality of UART modules;

(b) a second multiplexer/demultiplexer unit and a plurality of second bi-directional buses coupling said second multiplexer/demultiplexer unit to the plurality of transceivers;

(c) a bi-directional common bus, coupled between said first multiplexer/demultiplexer unit and said second multiplexer/demultiplexer unit, for providing data communication between the plurality of UART modules and the plurality of transceivers; and (d) a control unit for selectively connecting said common bus to a selected one of said plurality of first buses and to one of said plurality of second buses, so as to connect one of the plurality of UART modules in the first IC chip to a selected one associated transceiver in the second IC chip.

2. An apparatus as claimed in claim 1, wherein said first multiplexer/demultiplexer unit and said control unit are incorporated in the first IC chip.

3. An apparatus as claimed in claim 1, wherein said second multiplexer/demultiplexer unit is incorporated in the second IC chip.

4. An apparatus as claimed in claim 1, wherein the common bus includes a number of signal lines that is the same as a number of signal lines included in the largest of the plurality of first bi-directional buses and the plurality of second bi-directional buses.

5. A data communication apparatus for communication among a plurality of computers, comprising:

a plurality of interfaces, each for connection to a respective one of the computers;

a first IC chip having a plurality of universal asynchronous receiver/transmitter (UART) modules;

a second IC chip having a plurality of transceivers connected to the interfaces;

a first multiplexer/demultiplexer unit and a plurality of first bi-directional buses coupling said first multiplexer/demultiplexer unit to the plurality of UART modules;

a second multiplexer/demultiplexer unit and a plurality of second bi-directional buses coupling said second multiplexer/demultiplexer unit to the plurality of transceivers;

a bi-directional common bus, coupled between said first multiplexer/demultiplexer unit and said second multiplexer/demultiplexer unit, for providing data communication between the plurality of UART modules and the plurality of transceivers; and a control unit for selectively connecting said common bus to one of said plurality of first buses and to one of said plurality of second buses, so as to connect a selected one of the plurality of UART modules in the first IC chip to a selected one associated transceiver in the second IC chip.

6. An apparatus as claimed in claim 5, wherein said first multiplexer/demultiplexer unit and said control unit are incorporated in the first IC chip.

7. An apparatus as claimed in claim 5, wherein said second multiplexer/demultiplexer unit is incorporated in the second IC chip.

8. An apparatus as claimed in claim 5, wherein said interfaces are RS-232 interfaces.

9. An apparatus as claimed in claim 5, wherein each of said interfaces is connected to a respective one of said transceivers by a bus that includes at least eight signal lines for carrying at least eight respective signals.

10. An apparatus as claimed in claim 5, wherein the common bus includes a number of signal lines that is the same as a number of signal lines included in the largest of the plurality of first bi-directional buses and the plurality of second bi-directional buses.

* * * * *